United States Patent
Dikhit et al.

(10) Patent No.: US 11,961,006 B1
(45) Date of Patent: Apr. 16, 2024

(54) NETWORK AUTOMATION AND ORCHESTRATION USING STATE-MACHINE NEURAL NETWORKS

(71) Applicant: Cisco Technology, Inc., San Jose, CA (US)

(72) Inventors: Aniruddh S. Dikhit, San Jose, CA (US); Khanh Vinh Nguyen, Milpitas, CA (US); Naveen Kumar Tyagi, Fremont, CA (US); Abhilash Sreedharan Nair Mannathanil, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 876 days.

(21) Appl. No.: 16/368,516

(22) Filed: Mar. 28, 2019

(51) Int. Cl.
*G06N 3/10* (2006.01)
*G06F 16/901* (2019.01)
*G06N 3/04* (2023.01)
*G06N 3/08* (2023.01)

(52) U.S. Cl.
CPC ........... *G06N 3/10* (2013.01); *G06F 16/9024* (2019.01); *G06N 3/04* (2013.01); *G06N 3/08* (2013.01)

(58) Field of Classification Search
CPC ... G06N 3/10; G06N 3/08; G06N 3/04; G06F 16/9024
See application file for complete search history.

(56) References Cited

U.S. PATENT DOCUMENTS

| | | | |
|---|---|---|---|
| 7,028,228 B1* | 4/2006 | Lovy | G06F 11/3495 |
| | | | 714/47.2 |
| 11,521,063 B1* | 12/2022 | Powers | G01D 5/30 |
| 2008/0208372 A1* | 8/2008 | Pannese | G05B 13/027 |
| | | | 700/48 |
| 2016/0034809 A1 | 2/2016 | Trenholm et al. | |
| 2019/0251469 A1* | 8/2019 | Wagstaff | G06N 20/00 |
| 2020/0250511 A1* | 8/2020 | Hu | G06Q 30/0233 |
| 2021/0174246 A1* | 6/2021 | Triplet | G06N 7/01 |

(Continued)

OTHER PUBLICATIONS

Faiedh H, Gafsi Z, Torki K, Besbes K. Digital hardware implementation of a neural network used for classification. InProceedings. The 16th International Conference on Microelectronics, 2004. ICM 2004. Dec. 6, 2004 (pp. 551-554). IEEE. (Year: 2004).*

(Continued)

*Primary Examiner* — Oluwatosin O Alabi
(74) *Attorney, Agent, or Firm* — Patterson + Sheridan, LLP

(57) ABSTRACT

Techniques for orchestrating a workflow for configuring a computer networking environment or other complex workflows are described. A Directed Acyclic Graph (DAG) that defines a plurality of tasks to be executed to complete the workflow and a plurality of orders between the tasks is received. Embodiments generate a State-Machine Neural Network (SNN) based on the received DAG, by generating a plurality of SNN neurons for the SNN, based on the plurality of tasks within the received DAG and generating a plurality of SNN connections for the SNN, connecting pairs of SNN neurons within the plurality of SNN neurons, based on the plurality of connections within the received DAG. The SNN is executed to orchestrate the workflow by sending and receiving signals to and from the SNN neurons.

20 Claims, 11 Drawing Sheets

(56) References Cited

U.S. PATENT DOCUMENTS

2021/0248474 A1* 8/2021 Baker .................. G06N 3/0454

OTHER PUBLICATIONS

Natschläger T, Maass W. Spiking neurons and the induction of finite state machines. Theoretical computer science. Sep. 25, 2002; 287(1):251-65. (Year: 2002).*
Jing CS, Pebrianti D, Abas MF, Bayuaji L. Fault tolerance for two wheel mobile robot using FSM (finite state machine). International journal of software engineering and computer systems. Mar. 6, 2017;3(3):106-19. (Year: 2017).*
Koul A, Greydanus S, Fern A. Learning finite state representations of recurrent policy networks. arXiv preprint arXiv:1811.12530. Nov. 29, 2018. (Year: 2018).*
Singh SP, Srivastava VM. Implementation of digital neuron cell using 8-bit activation function. In2011 Nirma University International Conference on Engineering Dec. 8, 2011 (pp. 1-4). IEEE. (Year: 2011).*
David Harel, "Statecharts: a visual formalism for complex systems," Science of Computer Programming, vol. 8, Issue 3, Jun. 1987, pp. 231-274.
Statecharts aka Haral Charts, McGill, Oct. 2001, 39 pages.
State Chart XML (SCXML): State Machine Notation for Control Abstraction, W3C Recommendation, Sep. 1, 2015.
Van Gerven Marcel, Bohte Sander, "Editorial: Artificial Neural Networks as Models of Neural Information Processing," Fronttiers in Computational Neuroscience, vol. 11,2017, 114 pages.

* cited by examiner

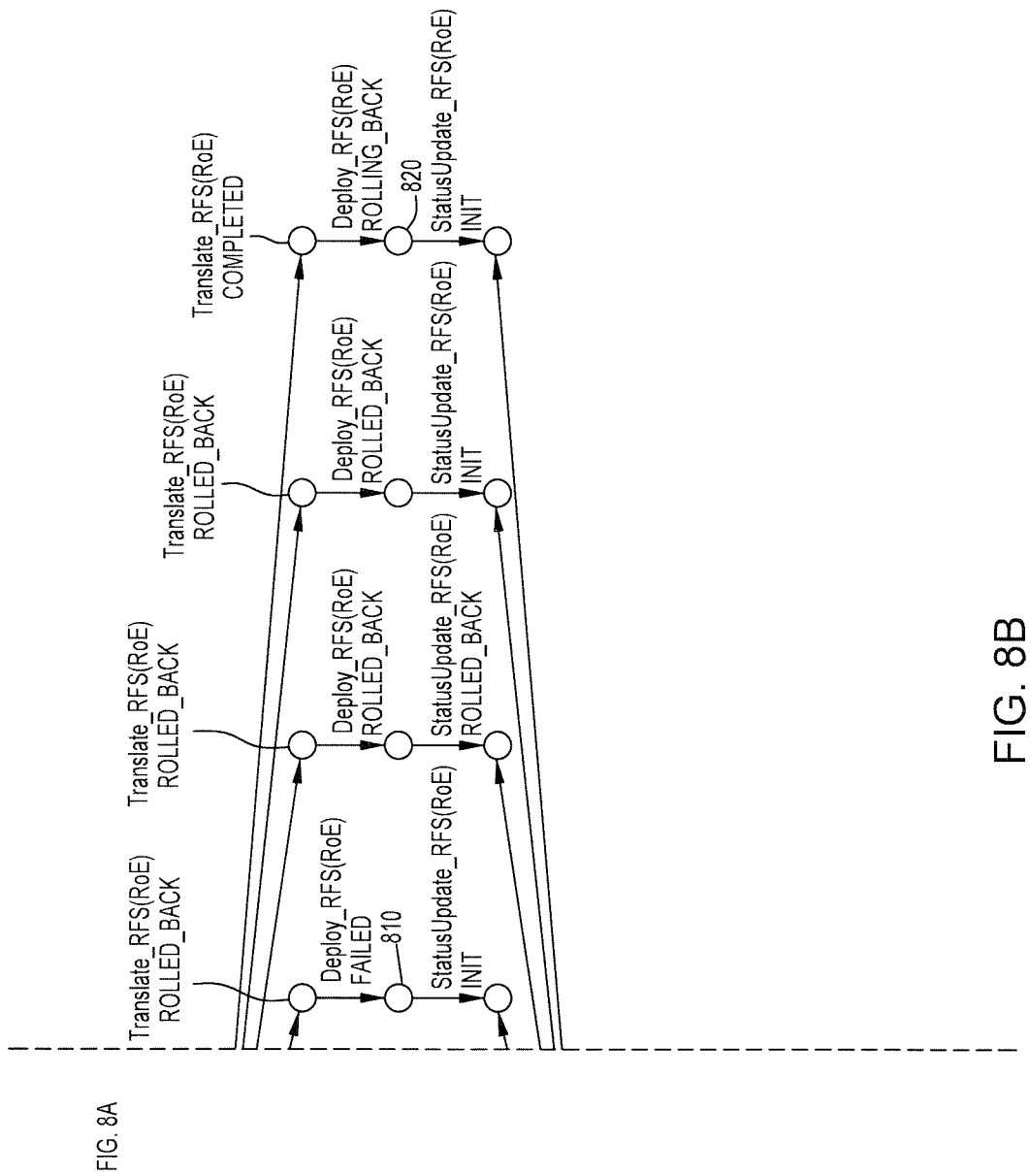

NETWORK AUTOMATION AND ORCHESTRATION USING STATE-MACHINE NEURAL NETWORKS

TECHNICAL FIELD

Embodiments presented in this disclosure generally relate to computer network automation and orchestration, and more specifically, though not exclusively, embodiments disclosed herein provide techniques for computer network automation and orchestration through the use of a state-machine neural network.

BACKGROUND

Modern control systems, such as controllers for computer data communication networks, require increasingly larger and more complex workflows and processes. As a result, the technical challenge of defining, configuring, and orchestrating these complex processes has become very difficult. Conventionally, an expert user could manually construct a Finite State Machine (FSM) or a similar structure (e.g., a Statechart) to model the various execution states of the process of performing a large-scale operation on a complex system. For example, a network engineer could manually construct a FSM that models the states of the process of configuring a large-scale Software-Defined Network (SDN). However, if such a configuration operation has numerous tasks, the number of states in the FSM can grow exponentially. For example, if the configuration operation has N tasks and each task has M different status values, the FSM can potentially have up to $M^N$ unique states. Thus, a FSM constructed for an operation that includes 10 tasks, each having 4 different status values, could potentially have up to 1,048,576 different states. As a result, such FSMs can quickly scale to a level of size and complexity that they simply are infeasible for use with modeling complex operations.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 8A-B is a screenshot of a graphical user interface for illustrating the execution status of a SNN execution graph, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
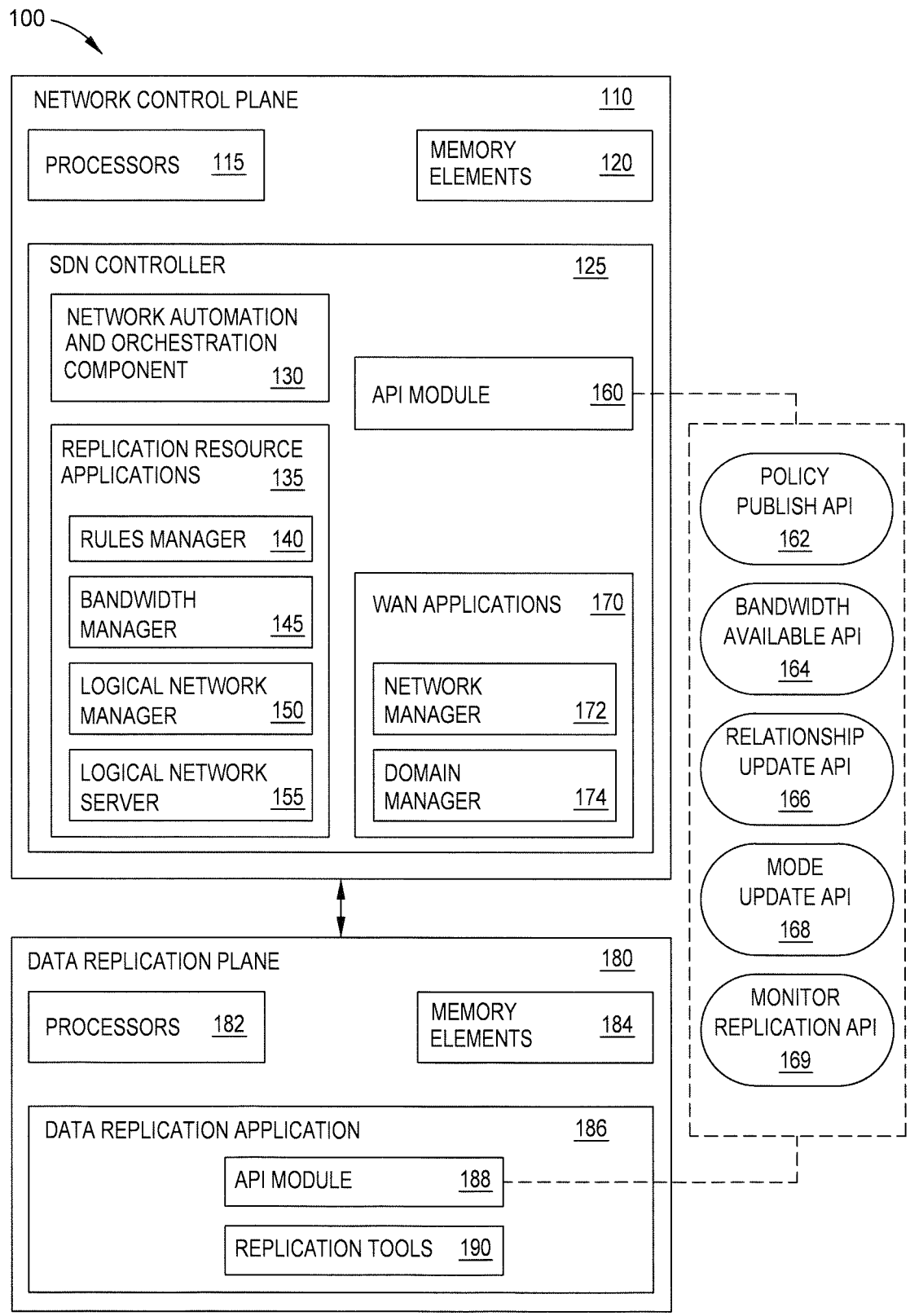
FIG. 1 is a simplified block diagram illustrating example details of a communication system configured with a network automation and orchestration component, according to one embodiment described herein.

One embodiment presented in this disclosure provides a method of orchestrating a workflow. The method includes receiving a Directed Acyclic Graph (DAG) that defines a plurality of tasks to be executed to complete the workflow and a plurality of orders between the plurality of tasks. The DAG includes the plurality of tasks and a plurality of connections that connect pairs of tasks within the plurality of tasks. The method further includes generating a State-Machine Neural Network (SNN) based on the received DAG, including generating a plurality of SNN neurons for the SNN, based on the plurality of tasks within the received DAG, and generating a plurality of SNN connections for the SNN, connecting pairs of SNN neurons within the plurality of SNN neurons, based on the plurality of connections within the received DAG. The method further includes executing the SNN to orchestrate the workflow by sending and receiving events to and from the SNN neurons.

Another embodiment presented in this disclosure provides a system that includes one or more computer processors and a memory containing computer program code that, when executed by operation of the one or more computer processors, performs an operation. The operation includes receiving a Directed Acyclic Graph (DAG) that defines a plurality of tasks to be executed to complete the workflow and a plurality of orders between the plurality of tasks. The DAG includes the plurality of tasks and a plurality of connections that connect pairs of tasks within the plurality of tasks. The operation further includes generating a State-Machine Neural Network (SNN) based on the received DAG, including: generating a plurality of SNN neurons for the SNN, based on the plurality of tasks within the received DAG, and generating a plurality of SNN connections for the SNN, connecting pairs of SNN neurons within the plurality of SNN neurons, based on the plurality of connections within the received DAG. The operation further includes executing the SNN to orchestrate the workflow by sending and receiving events to and from the SNN neurons.

Another embodiment presented in this disclosure provides a non-transitory computer-readable medium containing computer program code that, when executed by operation of one or more computer processors, performs an operation. The operation includes receiving a Directed Acyclic Graph (DAG) that defines a plurality of tasks to be executed to complete the workflow and a plurality of orders between the plurality of tasks. The DAG includes the plurality of tasks and a plurality of connections that connect pairs of tasks within the plurality of tasks. The operation further includes generating a State-Machine Neural Network (SNN) based on the received DAG, including: generating a plurality of SNN neurons for the SNN, based on the plurality of tasks within the received DAG, and generating a plurality of SNN connections for the SNN, connecting pairs of SNN neurons within the plurality of SNN neurons, based on the plurality of connections within the received DAG. The operation further includes executing the SNN to orchestrate the workflow by sending and receiving events to and from the SNN neurons.

EXAMPLE EMBODIMENTS

Techniques for configuring a computer networking environment are described. A Directed Acyclic Graph (DAG) that defines a plurality of tasks to be executed to configure the computer networking environment and a plurality of orders between the various tasks is received. The DAG includes a plurality of network configuration tasks and a plurality of connections that connect pairs of network configuration tasks within the plurality of network configuration tasks. Embodiments generate a State-Machine Neural Network (SNN) based on the received DAG, by generating a plurality of SNN neurons for the SNN, based on the plurality of network configuration tasks within the received DAG and generating a plurality of SNN connections for the SNN, connecting pairs of SNN neurons within the plurality of SNN neurons, based on a plurality of connections within the received DAG. Execution of the SNN is initiated to configure networking devices within the computer networking environment.

Software Define Networking (SDN) controllers and other automation systems such as robotics often involve complex operations with numerous tasks that need to be timed and synchronized in certain orders or sequences. For example, deploying a new security policy or service in a large enterprise network may require multiple configuration steps to be done on thousands of devices in a coordinated manner. For such large systems, programming and orchestrating complex operations can be difficult and error-prone, especially under dynamic conditions with unexpected events such as device failures, timeout, and other interruptions.

One common approach to orchestrate an operation with multiple steps or tasks is to use a finite state machine (FSM) to keep track of the current status of the tasks of the operation. If the operation has numerous tasks, the number of states in the FSM can grow exponentially. For example, if there are N=10 tasks, and each task has M=4 different status, then the FSM can potentially have up to $M^N$ unique states (i.e., 10416976, in the present example). Implementing a FSM with such a large number of states, much less a more complicated FSM with a significantly larger number of states, is not desirable or even technically feasible with modern technology.

To reduce the number of FSM states, applications often use "compound" state machines such as Harel/SCXML charts in which each state can contain a hierarchy of children states. Although this method can drastically reduce the number of states, defining such compound, hierarchical state machines can be tricky and difficult, especially when there are state transitions between child states that belong to different parent states. Given a simple workflow, the corresponding SCXML chart which is executed by the orchestration software component can be quite complicated and unintuitive. SCXML chart can get even more complicated if the system is required to roll back the operations when certain critical tasks fail. Orchestrating a rollback of a partially completed operation can be tricky, as the rollback sequence itself needs to be done in proper orders. Designing and customizing a SCXML chart to control thousands of devices is thus very difficult and error-prone and often beyond the ability of most users who have limited technical expertise. As a result, a technical solution is needed to the technical problem of orchestrating the configuration and management of a highly complex system, such as a software defined network (SDN). Having an intuitive, simple and powerful method to model, customize, and orchestrate complex workflows is thus a technical problem to be solved for today automation systems in general and particularly in SDN controllers.

As such, embodiments described herein provide a system for orchestrating the performance of a complex operation on a complex system, such as a SDN controller. According to one embodiment, a Directed Acyclic Graph (DAG) is received that defines a plurality of tasks to be executed to configure the computer networking environment and a plurality of orders between the various tasks. The DAG can include a plurality of network configuration tasks and a plurality of connections that connect pairs of network configuration tasks within the plurality of network configuration tasks.

One embodiment includes generates a State-Machine Neural Network (SNN) based on the received DAG. In a particular embodiment, the SNN is generated by, at least in part, generating a plurality of SNN neurons for the SNN, based on the plurality of network configuration tasks within the received DAG, and generating a plurality of SNN connections for the SNN, connecting pairs of SNN neurons within the plurality of SNN neurons, based on a plurality of connections within the received DAG. Embodiments can then initiate execution of the SNN to configure a plurality of networking devices within the computer networking environment. Doing so provides an efficient and automated system for orchestrating complex workflows for a complex SDN.

FIG. 1 is a simplified block diagram illustrating example details of a communication system 100 configured with a network automation and orchestration component, according to one embodiment described herein. Generally speaking, control of a network (such as a wide area network (WAN)) for data replication activities may be abstracted to a network control plane 110, while control for various data replication activities including, but not limited to, filer creation, data compression, replication management, etc., may remain within a data replication plane 180. Network control plane 110 may include processors 115 and memory elements 120 to facilitate activities and operations described herein in the present disclosure. SDN controller 125 may operate in the network control plane 110. The SDN controller 125 can be provisioned with API module 160, replication resource applications 135 and WAN applications 170. Replication resource applications 135 and WAN applications 170 may interface with each other as well as with one or more APIs provided by API module 160 to facilitate various tasks, operations, processes, functions, etc. as described herein in the present disclosure. Furthermore, SDN controller 125 described and shown herein (and/or its associated structures) may also include suitable interfaces for receiving, transmitting, and/or otherwise communicating data or information in a network environment.

Replication resource applications 135 can include a rules manager 140, a bandwidth manager 145, a logical network manager 150 and a logical network server 155. Rules manager 140 may facilitate creating network rules, algorithms, functions, etc. based on one or more replication policies, one or more SLAs, one or more data replication application 186 operation modes and/or one or more bandwidth requirements for one or more mirror/replication relationships.

Bandwidth manager 145 may facilitate bandwidth slicing of WAN for one or more replication relationships according to rules created by rules manager 140, based on bandwidth slices allocated to other replication relationships and based on bandwidth consumed by non-data replication traffic (e.g., normal data traffic, data traffic related to the operation of applications, etc.). Logical network manager 150 may facilitate creating, managing, maintaining, monitoring, ranking and/or sorting one or more logical network instances and associated logical networks. Logical network manager 150 may interface with rules manager 140, bandwidth manager 145 and logical network server 155 to facilitate the aforementioned activities. Logical network server 155 may facilitate storage of logical network instances and data or information that may be associated thereto including, but not limited to, replication policies, including SLAs, one or more network rules configured by rules manager 140 related to allocation of network resources, forwarding plane information for one or more switches 24, logical interface information, link information, combinations thereof or any other type of information related to managing logical networks for data replication activities.

WAN applications 170 can include a network manager 172 and a domain manager 174. Network manager 172 can manage WAN resources in combination with logical network manager 150 to facilitate efficient allocation of network resources, including switches, as well as controlling/setting forwarding planes for switches. Domain manager 174 can assign a unique domain ID per switch. Each server or storage device logging into a switch, including logical devices (e.g., logical interfaces) may be assigned an address including the domain ID of the switch, which may aid in controlling forwarding planes for switches.

Data replication plane 180 may include processors 182 and memory elements 184 to facilitate activities and operations described herein in the present disclosure. Data replication application 186 can operate in data replication plane 180. Data replication application 186 can be provisioned with API module 188 and replication tools 190. Replication tools 190 can provide functions, applications, modules, etc. to facilitate replication data from source Fabric Attached Storage (FAS) to destination FAS. In various embodiments, replication tools 190 may be provided by a third party data replication software vendor, such as, for example SnapMirror® by NetApp®. One or more APIs provisioned in API module 188 can interface with replication tools 190 to facilitate various tasks, operations, processes, functions, etc. described herein in this Specification.

API modules 160 and 188 may also be used to provide interfacing between SDN controller 125 and data replication application 186 such that SDN awareness can be established for data replication application 186 and data replication awareness can be established for SDN controller 125. Note that an "application" and/or "API" as used herein in this Specification, can be inclusive of an executable file comprising instructions that can be understood and processed on a computer, and may further include library modules loaded during execution, object files, system files, hardware logic, software logic, or any other executable modules.

API modules 160 and 188 may include a policy publish API 162, a bandwidth available API 164, a relationship update API 166, a mode update API 168 and a monitor replication API 169. Policy publish API 162 may include functions and function calls, sometimes referred to as a "library," to facilitate activities associated with publishing policies for filers and mirror/replication relationships. Bandwidth available API 164 may include a library of functions and function calls to facilitate activities associated with determining an available WAN bandwidth for a particular mirror/replication relationship given a corresponding SLA for the mirror/replication relationship. Relationship update API 166 may include a library of functions and function calls to facilitate activities associated with updating SDN controller 125 with information related to new mirror/replication relationships being created as well as mirror/replication relationships being broken. Monitor replication API 169 may include a library of functions and function calls to facilitate activities associated with SDN controller 125 monitoring replication activities performed by data replication application 186 and/or one or more replication tools 190 that may be included therein. The monitoring may be performed in order to make appropriate arrangements with switches for logical networks (as determined from the associated logical network instances) for the replication of different types of data from source FAS (e.g., source filers) to destination FAS (e.g., destination filers).

In some embodiments, API modules 160 and 188 may both include functions and function calls to the policy publish API 162, the bandwidth available API 164, the relationship update API 166, the mode update API 168 and the monitor replication API 169. In another embodiment, API module 160 may include functions and function calls to the policy publish API 162, the bandwidth available API 164, the relationship update API 166, the mode update API 168 and the monitor replication API 169, while API module 188 may only include function calls to the corresponding functions. In such an embodiment, networking vendors could augment the APIs in networking equipment and expose the APIs for use by data replication applications/software by exposing the function calls to API module 188 for the functions included in API module 160. By exposing only function calls to API module 188, networking vendors may protect network specific protocol information, topology information or the like. In yet another embodiment, certain functions and function calls may be local to API module 160 while its local function calls may be exposed to API module 188 and, additionally, certain functions and function calls may be local to API module 188 while its local function calls may be exposed to API module 160. In this manner, networking vendors and data replication software vendors could expose only certain information, while protecting other business specific information.

In the depicted embodiment, the SDN controller 125 also contains a network automation and orchestration component 130. Generally, the network automation and orchestration component 130 is configured to model and orchestrate complex workflows using a State-Machine Neural Network (SNN). Doing so provides a more intuitive, simpler, and more powerful technical solution to the technical problem of orchestrating complex operations across complex systems, particularly relative to existing methods based on Harel/SCXML state charts. Moreover, the network automation and orchestration component 130 using a SNN is able to perform large-scale network automation on thousands of devices, while conventional solutions lack the scalability and ease-of-use to handle such complex systems.

Generally, the network automation and orchestration component 130 can generate and execute a SNN in which each neuron has its own memory (i.e., state). Similar to Artificial Neural Network (ANN) neurons, SNN neurons can have multiple inputs and outputs. However, instead of a stateless transfer functions as in ANN, each SNN neuron can contain a finite state machine (FSM) which stores a current state of the neuron. Additionally, the FSM can be used to determine state changes for the neuron according to input events. Unlike ANN inputs (which are typically analog signals), SNN inputs can be discrete signals (e.g., events). When a SNN neuron receives an input signal, a FSM state transition table can be used to determine the new state of the neuron, based on the input signal and the previous state of the neuron. After making the state transition, the neuron may perform a set of actions of emitting signals to its output synapses.

In one embodiment, the network automation and orchestration component 130 receives a data structure (e.g., a Directed Acyclic Graph (DAG)) that defines a plurality of tasks to be executed to configure the computer networking environment and a plurality of orders between the various tasks. The data structure can specify a plurality of network configuration tasks and a plurality of connections that connect pairs of network configuration tasks within the plurality of network configuration tasks. The network automation and orchestration component 130 can generate a SNN based on the received DAG. For example, the network automation and orchestration component 130 could generate a plurality of SNN neurons for the SNN, based on the plurality of network configuration tasks within the received DAG, and the network automation and orchestration component 130 could generate a plurality of SNN connections for the SNN, connecting pairs of SNN neurons within the plurality of SNN neurons, based on a plurality of connections within the received DAG. In order to carry out the orchestration of the complex operation, the network automation and orchestration component 130 can initiate execution of the SNN to configure a plurality of networking devices within the computer networking environment. Doing so provides an efficient, intuitive and scalable system for orchestrating complex operations across complex systems such as large-scale computer networks.

As described herein, a State-Machine Neural Network (or Stateful Neural Network) is a directed graph of SNN neurons with additional external inputs and outputs to connect to external and peripheral devices that are to be orchestrated. In one embodiment, each output of an SNN neuron can be connected to the inputs of other neurons or to the external outputs and vice versa. In a particular embodiment, a SNN network can be mathematically defined by the tuple (V, E), where V represents a finite set of SNN neurons and E represents a set of connections which are ordered pairs (o, r), in which o represents an output of a transmitting neuron and r is a receiving neuron.

In one embodiment, each SNN neuron can be mathematically defined by the following 5-tuple: (S, E, O, F, A), where S represents a finite set of states, E represents a finite set of discrete events, O represents a finite set of outputs, F represents a state transition function that maps a state and an event to a new state and is defined as F=(S×E)→S, and A represents an activation function that maps a state and an input event to an output and output event and is defined as A=(S×E)→(O×E).

In one embodiment, each SNN neuron within the SNN is initialized with a predefined initial state. As external signals come to the inputs, the SNN neurons can start changing their states according to the state transition functions F and sending output signals according to the activation function A. Output signals can then be propagated to neighbor neurons according to the network connectivity E. At any given time, the state of the SNN system can be determined by the combination of the states of its neurons as well as any pending signals. During its operation, the SNN can send output signals to external outputs according to the activation functions of the SNN neurons.

According to one embodiment, a SNN can be used to simulate a control system in which input commands and sensor data are sent to SNN via its external inputs. As the SNN operates, the SNN can send control signals to external subsystems to control them as well as receiving feedback signals from these sub systems. As a result, a SNN can control and orchestrate complex systems with thousands of components by sending and receiving signals.

Figure 2:
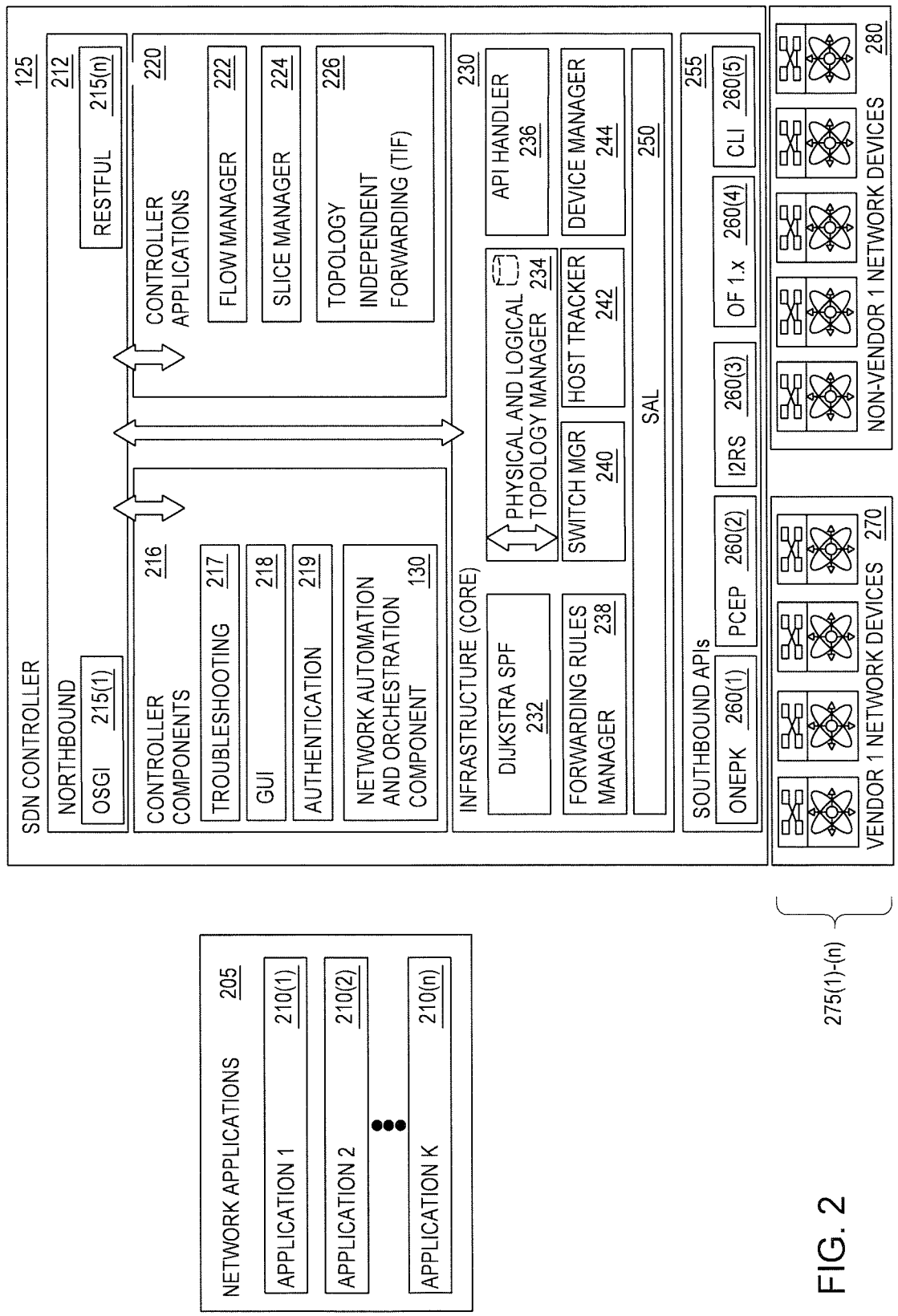
FIG. 2 is an architectural diagram of an SDN controller, applications and network devices, according to one embodiment described herein.

FIG. 2 is an architectural diagram of an SDN controller, applications and network devices, according to one embodiment described herein. In the depicted embodiment, the multi-protocol SDN controller 125 can support multiple SDN protocols between it and the network devices 275(1)-(N) it controls. In the example shown in FIG. 2, the network devices 275(1)-(N) include network devices from a first vendor (called Vendor 1) shown at reference numeral 270 and network devices from one or more other vendors, called Non-Vendor 1 network devices shown at reference numeral 280.

There are northbound application programming interfaces (APIs) 212 that enable communication between the network applications 205 (e.g., the applications 210(1)-(N)) and the SDN controller 125. The northbound APIs 212 are expandable on demand. Examples of northbound APIs 212 include an API compliant with the Open Service Gateway Initiative (OSGI) 215(1) and a Representational state transfer (RESTful) API 215(n).

Similarly, there are southbound APIs 255 that enable communication between the SDN controller 125 and the network devices 275(1)-(N). The southbound APIs 255 include dynamic plugins for different SDN communication protocols. Examples of southbound APIs include an API 260(1) compliant with the Cisco One Platform Kit (OnePK), an API 260(2) compliant with the Path Computation Element Communication Protocol (PCEP), an API 260(3) compliant with the Interface to Routing System (I2RS) standard, an API 260(4) compliant with the OpenFlow OF1.x standard, and a Command Line Interface (CLI) 260(4). The SDN controller 125 includes several functional subsystems, including an infrastructure (core) subsystem 230, a controller applications subsystem 216 and a controller components subsystem 220. All of these subsystems may be implemented as Java™ bundle, in one example.

Examples of functional blocks in the infrastructure subsystem 230 include a Dijkstra Shortest Path First (SPF) 232, Forwarding Rules Manager 238, Physical and Logical Topology Manager 234, Switch Manager 240, Host Tracker 242, Address Resolution Protocol (ARP) Handler 236 and Device Manager 244. The Physical and Logical Topology Manager 234 imports a topology from inventory or other sources. The Dijkstra SPF 232 and Forwarding Rules Manager 238 provide for advanced feature set capabilities.

Examples of functional blocks in the controller applications subsystem 216 include a Flow Manager 222, Slice Manager 224 and Topology Independent Forwarding (TIF)

226. The controller components subsystem 220 includes a Graphical User Interface (GUI) 218, an Authentication block 219 and a Troubleshooting block 217. The components for the controller applications subsystem 216 are used for deployment in a production network.

Generally speaking, the applications 210(1)-(N) running above the SDN controller 125 need to be opaque to the variety of SDN protocols. A Service Abstraction Layer (SAL) 250 is provided and serves as a shim layer abstraction in the infrastructure subsystem 230. Network level abstraction enables applications to interface via multiple SDN protocols with network devices in a heterogeneous network (devices in the network support a variety of SDN protocols) in an opaque fashion in order to fulfill desired services by one or more of the protocols. Abstraction is not limited or mapped to any particular protocol. Protocols can change and applications can vary. In addition, support for new protocols can be added as plugins.

In the depicted embodiment, the SDN controller 125 also contains the network automation and orchestration component 130. In one embodiment, the network automation and orchestration component 130 receives a DAG that defines a plurality of tasks to be executed to configure the computer networking environment and a plurality of orders between the various tasks, where DAG includes a plurality of network configuration tasks and a plurality of connections that connect pairs of network configuration tasks within the plurality of network configuration tasks. The network automation and orchestration component 130 can then generate a SNN based on the received DAG, by generating a plurality of SNN neurons for the SNN, based on the plurality of network configuration tasks within the received DAG and generating a plurality of SNN connections for the SNN, connecting pairs of SNN neurons within the plurality of SNN neurons, based on a plurality of connections within the received DAG. The network automation and orchestration component 130 can then initiate execution of the SNN to orchestrate the performance of a complex operation, such as configuring a plurality of networking devices within the computer networking environment.

In one embodiment, in generating the SNN, the network automation and orchestration component 130 is configured to generate a first plurality of SNN connections representing successful paths within the SNN. In such an embodiment, the successful paths can be taken during the execution of the SNN responsive to a network configuration operation corresponding to one of the SNN neurons within the respective pair of SNN neurons completing successfully. In a particular embodiment, in generating the SNN, the network automation and orchestration component 130 is configured to generate a second plurality of SNN connections representing error paths within the SNN, where the error paths are taken during the execution of the SNN responsive to a network configuration operation corresponding to one or more SNN neurons failing to complete successfully.

Additionally, in generating the SNN, the network automation and orchestration component 130 can generate a third plurality of SNN connections representing rollback paths within the SNN, where the rollback paths are taken during the execution of the SNN in order to rollback previously successfully executed network configuration tasks. Doing so enables the SNN to rollback already performed operations from upstream SNN neurons within the SNN, if a downstream SNN neuron experiences an error when attempting to perform its specified task(s).

In one embodiment, each of the plurality of SNN neurons comprises a respective Finite State Machine having a plurality of states, a plurality of state connections and conditional logic for selectively transitioning between the plurality of states using the plurality of state connections. For example, the plurality of states could (by way of example and without limitation) an initialization state, a running state, an aborted state, a failed state, a completed state, a rollback pending state, a rolling back state, a rollback completed stated and a rollback failed stated.

As discussed above, the SNN can be configured to perform a rollback operation to undo operations completed by upstream SNN neurons, e.g., when a downstream SNN neuron experiences an error. For example, during execution of the SNN, the network automation and orchestration component 130 could determine that at least one network configuration task did not complete successfully. In response, the network automation and orchestration component 130 could initiate a rollback operation for one or more SNN neurons of the plurality of SNN neurons, where the one or more SNN neurons had previously been executed successfully to perform one or more network configuration tasks during the execution of the SNN, and where the rollback operation rolls back the one or more network configuration tasks. Doing so enables the network automation and orchestration component 130 to gracefully handle errors and other problems when they occur during the execution of the SNN.

In one embodiment, the network automation and orchestration component 130 can provide a graphical user interface (GUI) that depicts the execution state of an SNN. In such an embodiment, during execution of the SNN, the network automation and orchestration component 130 could update the GUI depicting an execution state of the plurality of SNN neurons. In a particular embodiment, the GUI provides an indication of a respective execution state of each of the plurality of SNN neurons by color coding each of the plurality of SNN neurons using a selected one of a plurality of colors based on the current execution state of the respective SNN neuron, where each of the plurality of colors corresponds to a distinct execution state of a plurality of execution states.

As discussed above, the network automation and orchestration component 130 can generate and execute a SNN to control/orchestrate complex workflows very effectively. In one embodiment, the network automation and orchestration component 130 is configured to translate a declarative workflow specification (e.g., a DAG) into a SNN. Moreover, by generating and using a SNN as described herein, embodiments provide a powerful and scalable orchestration system than conventional solutions (e.g., orchestrators that use SCXML translation).

Generally, in orchestration/automation applications, workflows and processes can be specified declaratively by describing the following information: the number of steps/tasks and information about them, such as task executers and execution arguments; the ordering among the steps (e.g., step A needs to be executed after step B and C but before step D, etc.); error handling policies (i.e. what should be done if certain step fails); and transactional requirements, such as groups of steps that must be executed atomically. Directed Acyclic Graphs (DAG) are often used to describe step ordering. Generally, each node in a DAG represents a task (step) in the workflow, and each directed edge represent an execution dependency of a task on a preceding task. If there is no dependency between two tasks then it is implied that they could be executed in parallel as long as other orders are satisfied.

Figure 3:
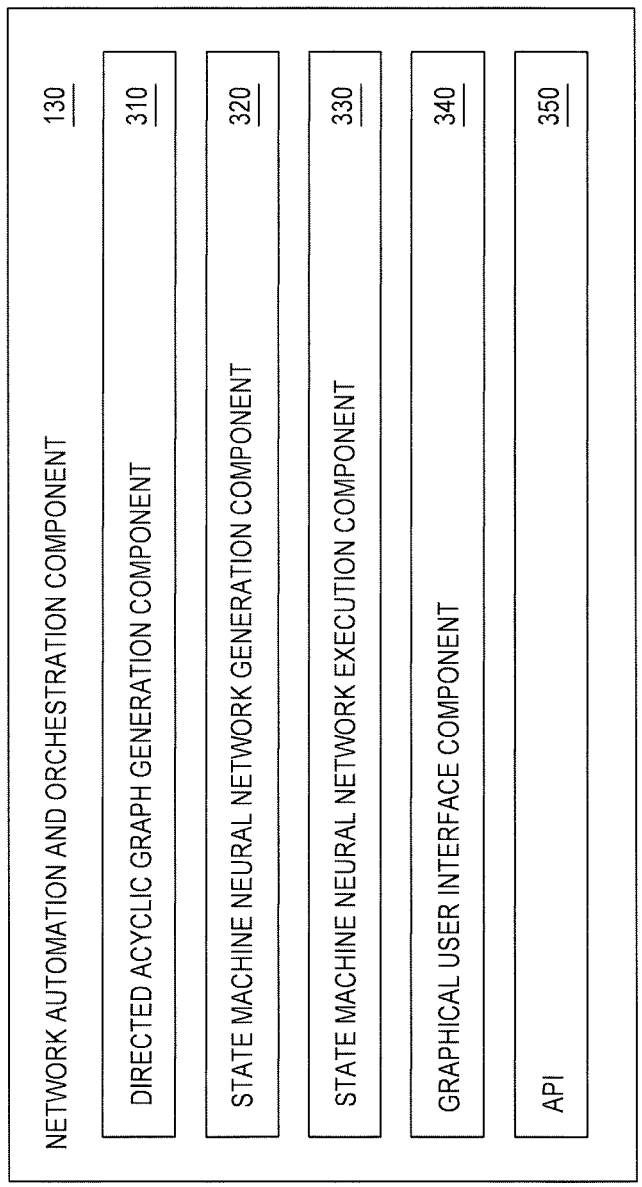
FIG. 3 is a block diagram illustrating sub-components of a network automation and orchestration component, according to one embodiment described herein.

FIG. 3 is a block diagram illustrating sub-components of a network automation and orchestration component, according to one embodiment described herein. As shown, the network automation and orchestration component 130 includes a DAG generation component 310, a SNN generation component 320, a SNN execution component 330, a GUI component 340 and an API 350. The DAG generation component 310 generally represents software logic that is capable of generating a DAG data structure for use in orchestrating a complex operation for a complex system.

The API 350 can provide one or more mechanisms through which users can interact with and control the network automation and orchestration component 130. The SNN generation component 320 generally represents software logic for generating a SNN from a declarative workflow specification. For example, the SNN generation component 320 could receive a DAG that defines a plurality of tasks to be executed to a computer networking environment, as well as timing information and orders between the various tasks, and so on. For example, a DAG could include a plurality of network configuration tasks and a plurality of connections that connect pairs of network configuration tasks within the plurality of network configuration tasks. The SNN generation component 320 could then generate a SNN based on the received DAG, by generating a plurality of SNN neurons for the SNN, based on the plurality of network configuration tasks within the received DAG and generating a plurality of SNN connections for the SNN, connecting pairs of SNN neurons within the plurality of SNN neurons, based on a plurality of connections within the received DAG.

The SNN execution component 330 generally represents logic for initiating and managing the execution of a SNN generated by the SNN generation component 320. For example, once a SNN is generated, the SNN execution component 330 could initiate execution of the SNN to orchestrate the performance of a complex operation, such as configuring a plurality of networking devices within the computer networking environment. As the SNN executes, the GUI component 340 could update a graphical user interface depicting the current execution state of the SNN.

Figure 4:
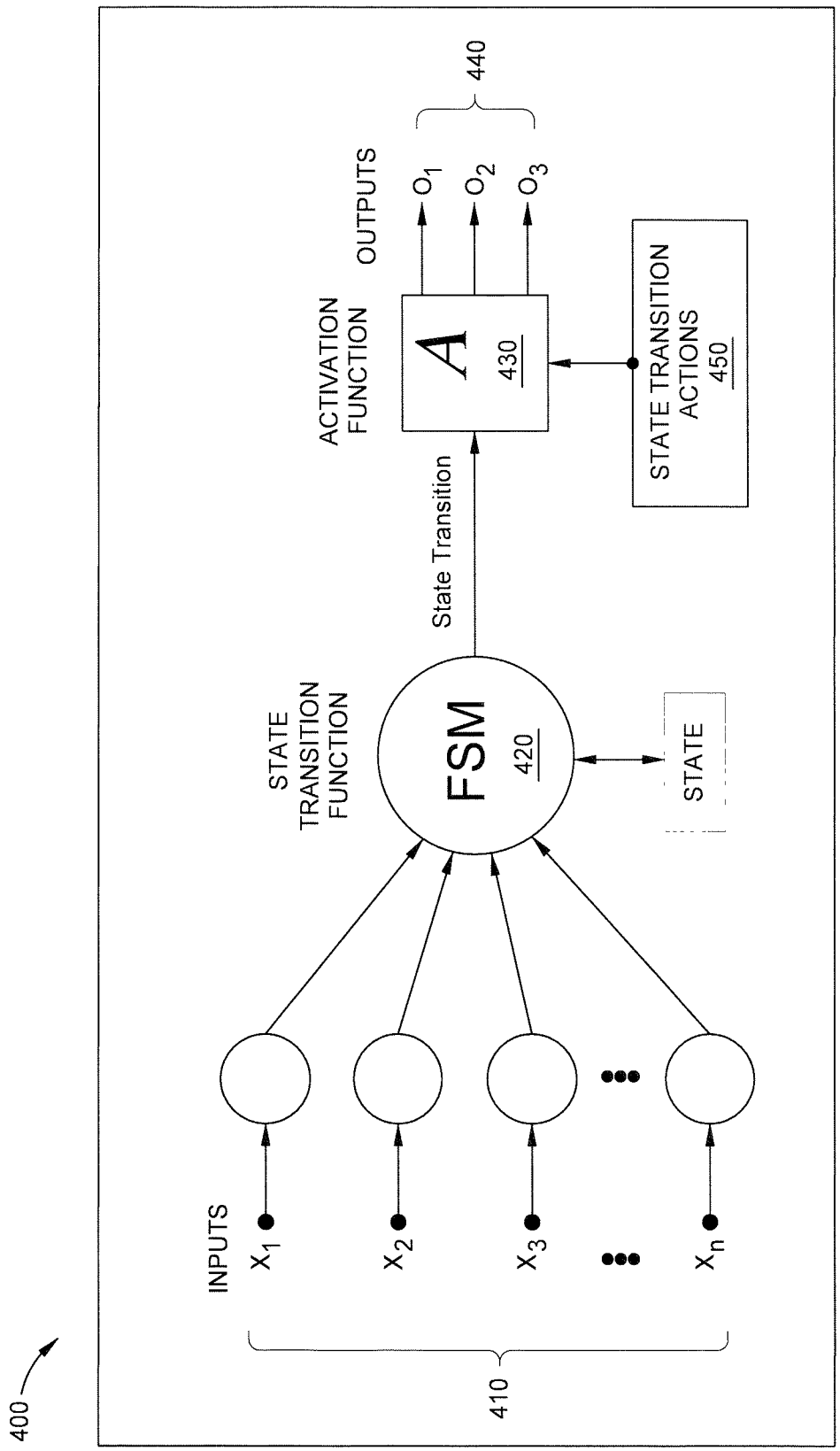
FIG. 4 is a diagram illustrating a SNN neuron, according to one embodiment described herein.

FIG. 4 is a diagram illustrating a SNN neuron, according to one embodiment described herein. As shown, the diagram 400 depicts a plurality of inputs $x_1$-$x_N$ 410 into a state transition function 420. The state transition function 420 can evaluate the inputs in view of the current state and can determine a new state to transition to. The determined state transition, as well as one or more station transition actions 450, can be processed as inputs to the activation function 430. The activation function 430 can then generate the outputs $o_1$-$o_N$ 440 which can be transmitted as inputs to another SNN neuron(s) within the SNN, as defined by network connectivity between the SNN neurons in the SNN. Additionally, the activation function 430 can generate one or more output events and transmit these output events to external outputs (i.e., components outside of the SNN). The network automation and orchestration component 130 could also receive the external events from the external inputs. As an example, the external input events could notify whether the corresponding operation(s) for a SNN neuron completed successfully, experienced an error, whether a rollback operation was completed and so on.

Figure 5:
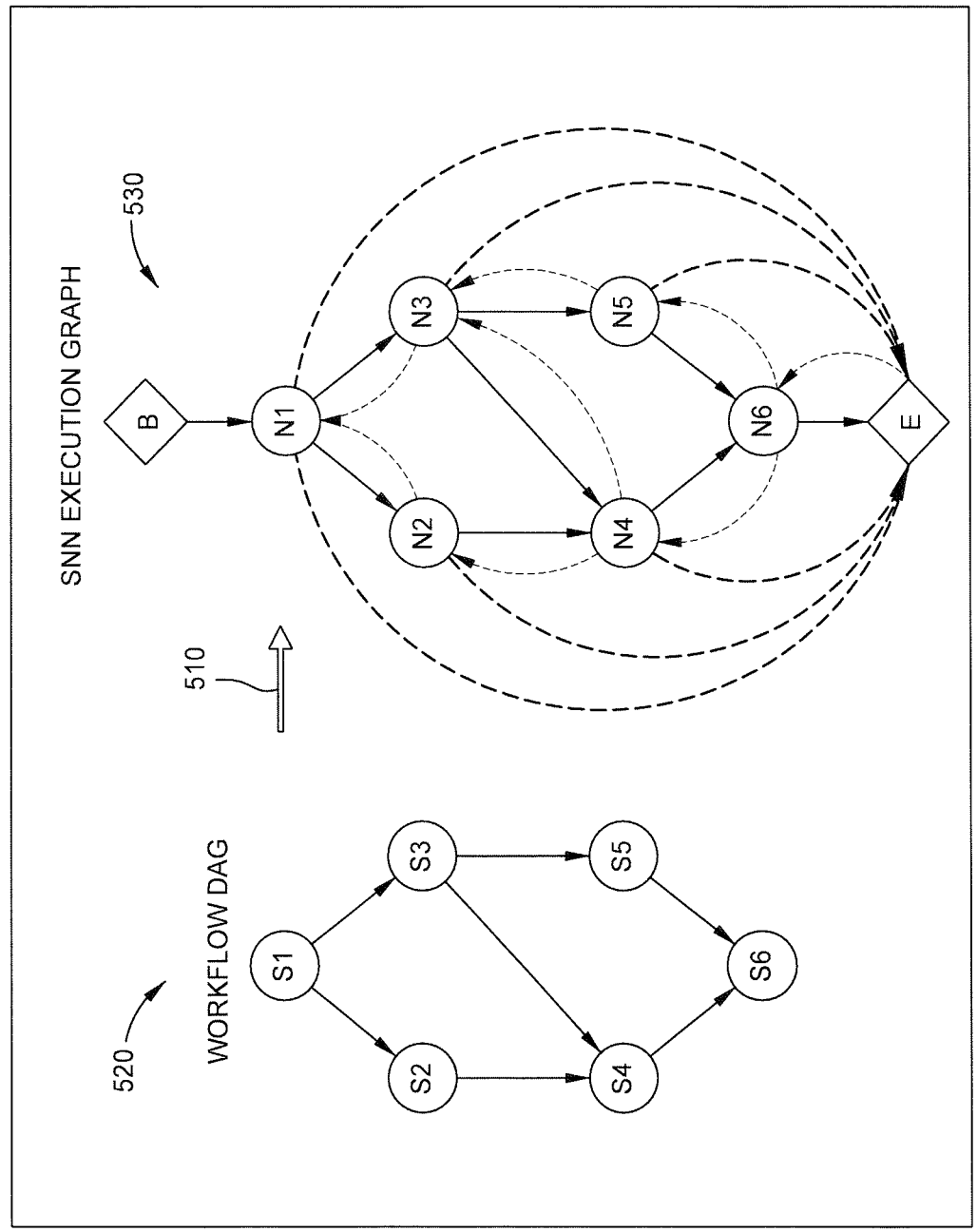
FIG. 5 is a diagram illustrating the generation of a State-Machine Neural Network (SNN) execution graph from a workflow DAG, according to one embodiment described herein.

FIG. 5 is a diagram illustrating the generation of a SNN execution graph from a workflow DAG, according to one embodiment described herein. As illustrated, the workflow 500 depicts a workflow DAG 520 being processed 510 by the SNN generation component 320 of the network automation and orchestration component 130 to produce the SNN execution graph 530. In the depicted example, the success path edges within the SNN execution graph are represented by solid lines, while the error paths are represented by dotted lines and the rollback paths are represented by dashed lines. In the depicted embodiment, the six task workflow defined by the DAG 520 has been transformed into the SNN 530 having a similar topology, but with additional nodes and additional connections for, e.g., transmitting errors and rollback signals.

In one embodiment, the network automation and orchestration component 130 is configured to generate an SNN from a declarative workflow DAG using at least one or more of the following operations. First, the network automation and orchestration component 130 could create a SNN neuron for each workflow step in the DAG graph (e.g., step S1→neuron N1). The network automation and orchestration component 130 could add two extra neurons B and E to the SNN to mark the beginning and end, respectively, of the workflow. The network automation and orchestration component 130 could connect the first (success) output of each neuron to its successors, e.g., the same way as the nodes are connected in the DAG graph. These connections could represent the "success" paths of the workflow.

Additionally, the network automation and orchestration component 130 could connect B to any neurons that have no predecessor (e.g., N1 in the workflow 500). Additionally, the network automation and orchestration component 130 could connect any neurons that have no successor (e.g., N6) to E. The network automation and orchestration component 130 could further connect the second (error) output of all neurons to E. These connections are used to conduct the error signals in the workflow. The network automation and orchestration component 130 could also connect the third (rollback) output of each neuron to its predecessor(s). These connections conduct the rollback path of the workflow.

Figure 6:
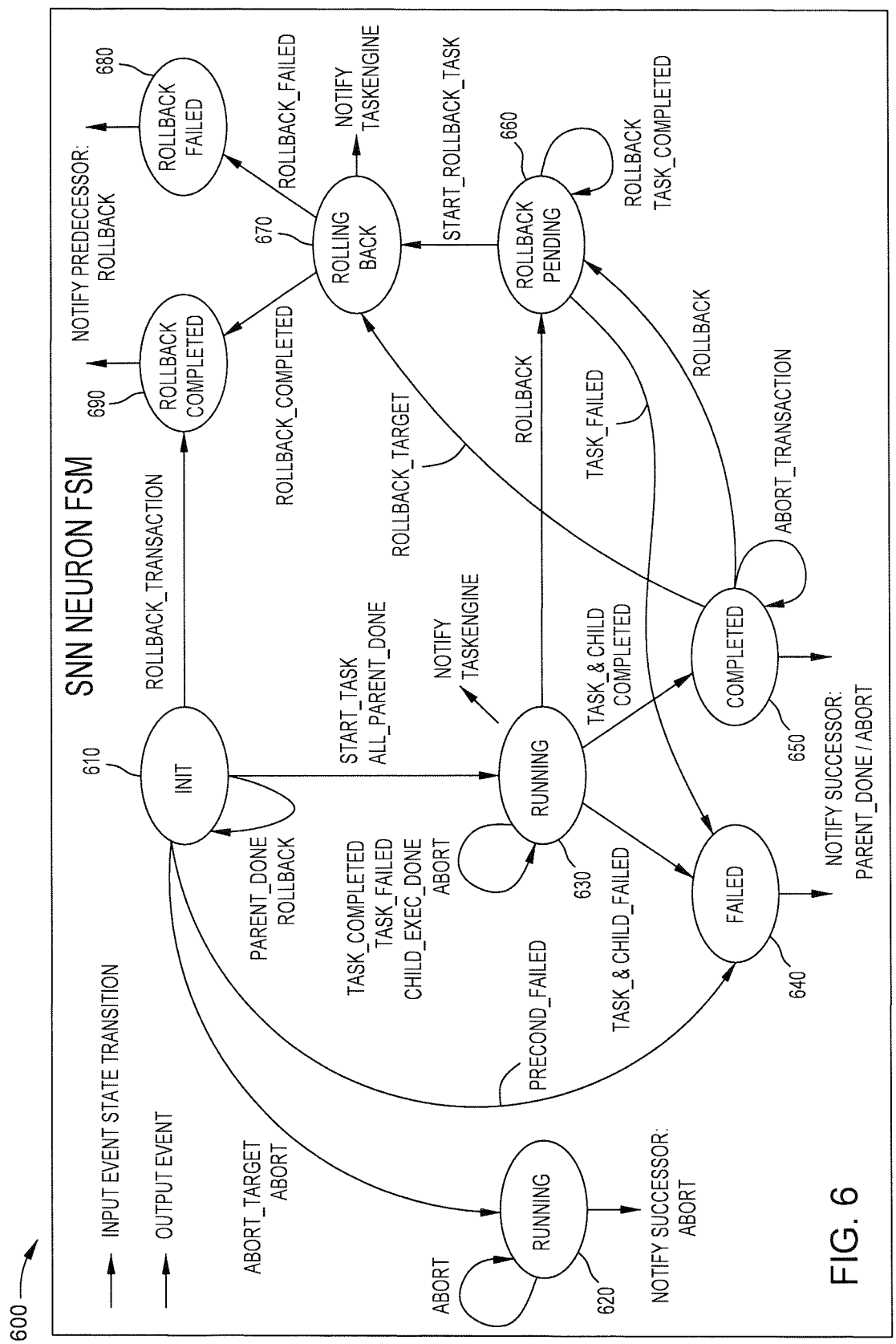
FIG. 6 is a diagram illustrating the Finite State Machine (FSM) of a SNN Neuron, according to one embodiment described herein.

Within each SNN neuron, the network automation and orchestration component 130 could define a FSM and could set the FSM to an initialization state. For example, the network automation and orchestration component 130 could define the FSM shown in FIG. 6 and could set the FSM to the INIT state. As shown in FIG. 6, the FSM 600 includes an INIT state 610, an ABORTED state 620, a RUNNING state 630, a FAILED state 640, a COMPLETED state 650, a ROLLBACK PENDING state 660, a ROLLING BACK state 670, a ROLLBACK FAILED state 680 and a ROLLBACK COMPLETED state 690. Additionally, the FSM 600 includes connections between the various states to represent state transitions. Each SSN neuron can transition between the various states, based on the output of the state transition function 420 when processing a given input event. Additionally, while FIG. 6 illustrates a particular FSM configuration, more generally embodiments described herein can use with any suitable FSM for defining SNN neurons, consistent with the functionality described herein.

In one embodiment, once the SNN is generated from the workflow DAG graph, the SNN execution component 330 could start the execution of the SNN by sending the START event to the B neuron of the SNN network. After the SNN receives this signal, it will start running by sending and receiving signals among the neurons and the external subsystems.

For example, execution of the SNN to orchestrate the workflow illustrated in FIG. 5 can have the following sequence of events. First the START signal is sent to neuron B to start the workflow. Neuron B, which has no task to execute, changes its state from INIT to COMPLETE and sends a PARENT_DONE event to its successor N1 via the success link. N1, upon receiving the PARENT_DONE signal, changes its state from INIT to RUNNING and sends an EXECUTE signal to the external task executor. In an embodiment, if a neuron has multiple parents (e.g., predecessors), it will change the state to RUNNING only after receiving the PARENT_DONE signals from all its parents. When the external task executor finishes the task successfully, it sends a TASK_COMPLETE signal to the neuron N1, which then changes its state to COMPLETE and sends PARENT_DONE events to its successors (e.g., N2 and N3). The chain of events continue until neuron E is reached, which marks the completion of the workflow. If any task fails, the external task executor will send a TASK_FAILED signal to the neuron, which moves its state to FAILED. If the error handling policy of the workflow is set to CONTINUE_ON_ERROR, the failed neuron will send the PARENT_DONE signals to its successors as usual, and the workflow continues. If the error handling policy is set to ROLLBACK_ON_ERROR, the failed neuron will send the ROLLBACK signal to the terminal neuron E via the error link. Upon receiving the ROLLBACK signal, neuron E will change its state to ROLLED BACK and propagate the ROLLBACK signals to its predecessor(s) via the rollback links. This causes the rollback actions to be propagated in reverse order, from E to B. When B is reached, the rollback of the workflow is completed. If the error handling policy is set to ABORT_ON_ERROR, the failed neuron will send the ABORT signal to the terminal neuron B, which will propagate the ABORT signals to the other neurons in the workflow.

Figure 7:
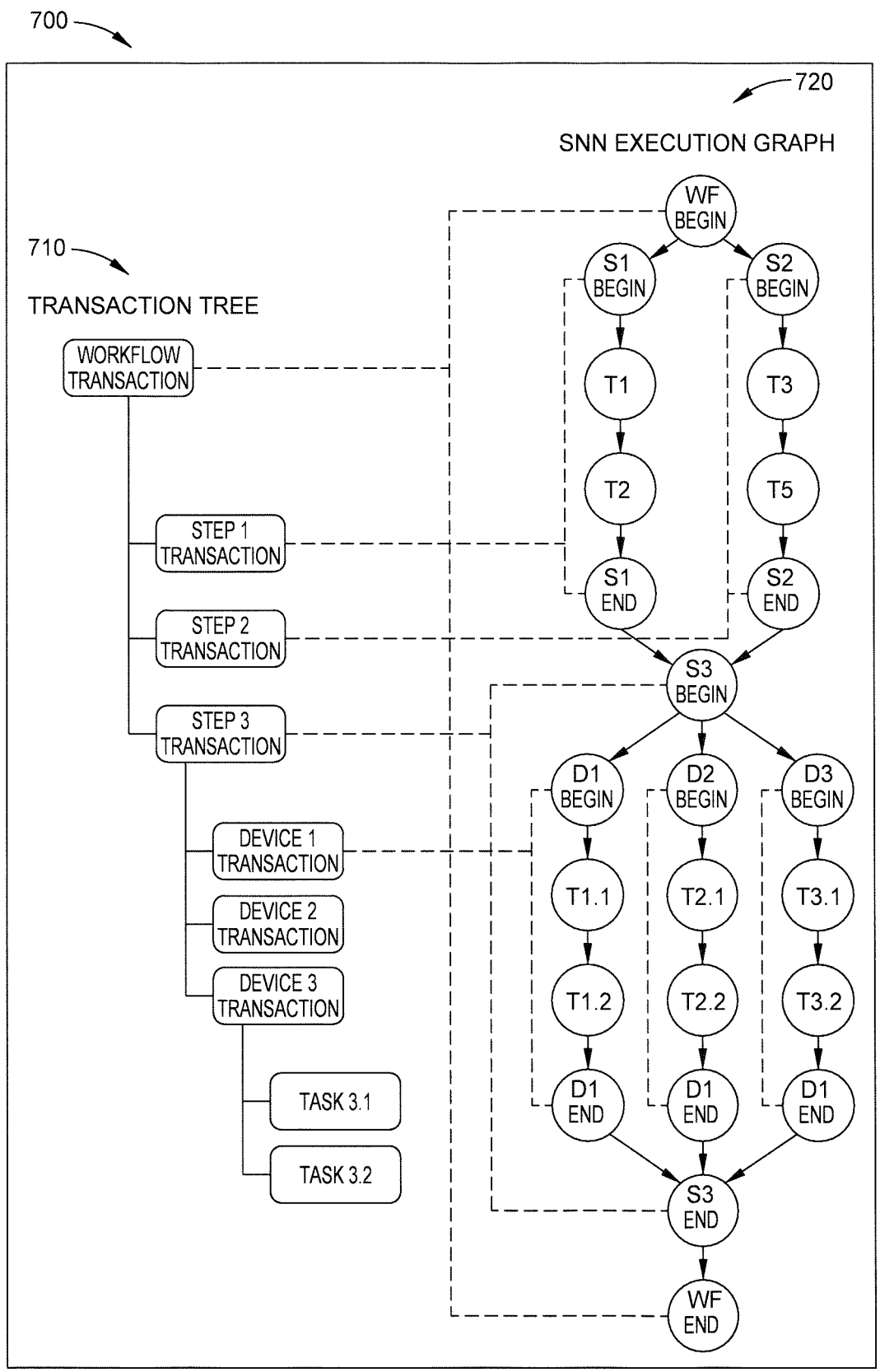
FIG. 7 is a transaction tree for the execution of a SNN execution graph, according to one embodiment described herein.

In one embodiment, the entire workflow is considered as one transaction that is to be executed or rolled back as a whole. In some embodiments, however, a workflow can be further divided into smaller transactions, each of which can have its own error handling policy. To support child transactions, additional neurons can be added to mark the beginning and end of each child transaction, similar to the B and E neurons in the above example. These "checkpoint" neurons have their own FSM to handle transactional actions such as abort or rollback the transaction. For example, the SNN execution graph shown in FIG. 7 has multiple level of nested transactions: workflow transaction, step transactions, and per-device transactions. In the illustrated embodiment, the diagram 700 includes a transaction tree 710 that illustrates the three levels of nested transactions for the SNN execution graph 720. Of note, while the depicted example contains three levels of nested transactions, more generally embodiments described herein can be used to generate and execute SNNs with any number of different levels of nested transactions, according to the functionality described herein.

In one embodiment, SNN graphs can have topology structures that are similar to the structures of their workflow DAG graphs. This facilitates visual monitoring of the workflow execution. The state of a workflow execution can be intuitively presented by a display of the SNN graph in which each neuron is showed with a color according to its current state. For example, a running task can be presented as a blue neuron, a successful task can be presented as a green neuron, a failed task can be presented as a red neuron, and a rolled back task can be presented as an orange neuron within the graphical user interface. As the neurons change their states, the SNN neurons can send additional notification signals to external systems such as loggers or real-time monitoring systems.

Figure 8A:
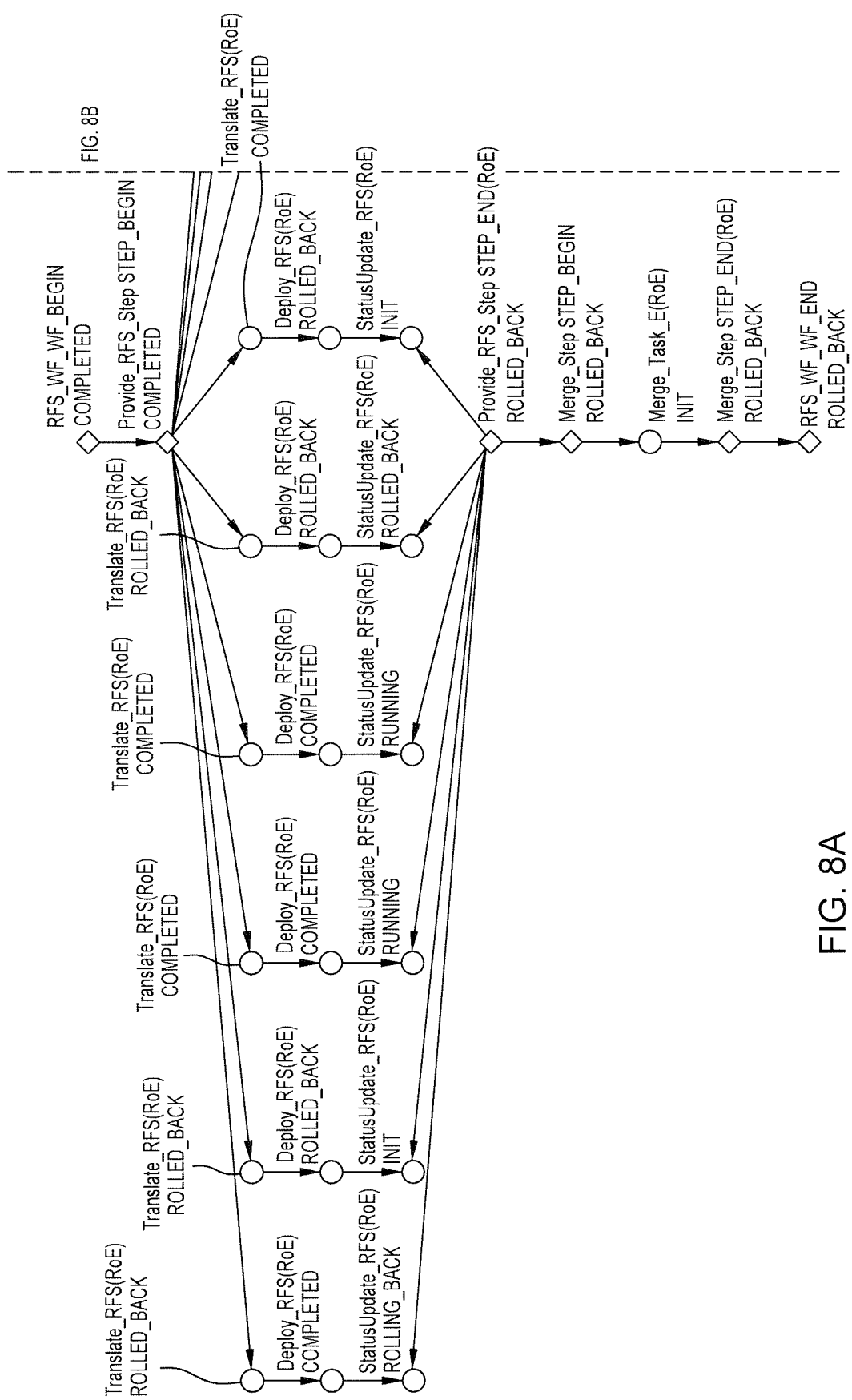

An example of such a graphical user interface is shown in FIGS. 8A-B, which illustrates a screenshot of a graphical user interface for illustrating the execution of a SNN execution graph, according to one embodiment described herein. In the depicted embodiment, the graphical user interface depicts a plurality of different SNN neurons and their corresponding states. For example, the SNN neuron 810 is currently experiencing a FAILED state, while the SNN neuron 820 is currently in the ROLLING_BACK state. The graphical user interface can be updated in real-time to show the current state of the SNN graph. In the depicted example, the deployment on one of the devices failed, which triggered the rollback of the entire workflow. Of note, the rollbacks of some tasks are blocked waiting for the tasks to be completed first. However, by using a SNN, embodiments described herein can handle multiple errors and ensure the workflow will is rolled back properly.

Figure 9:
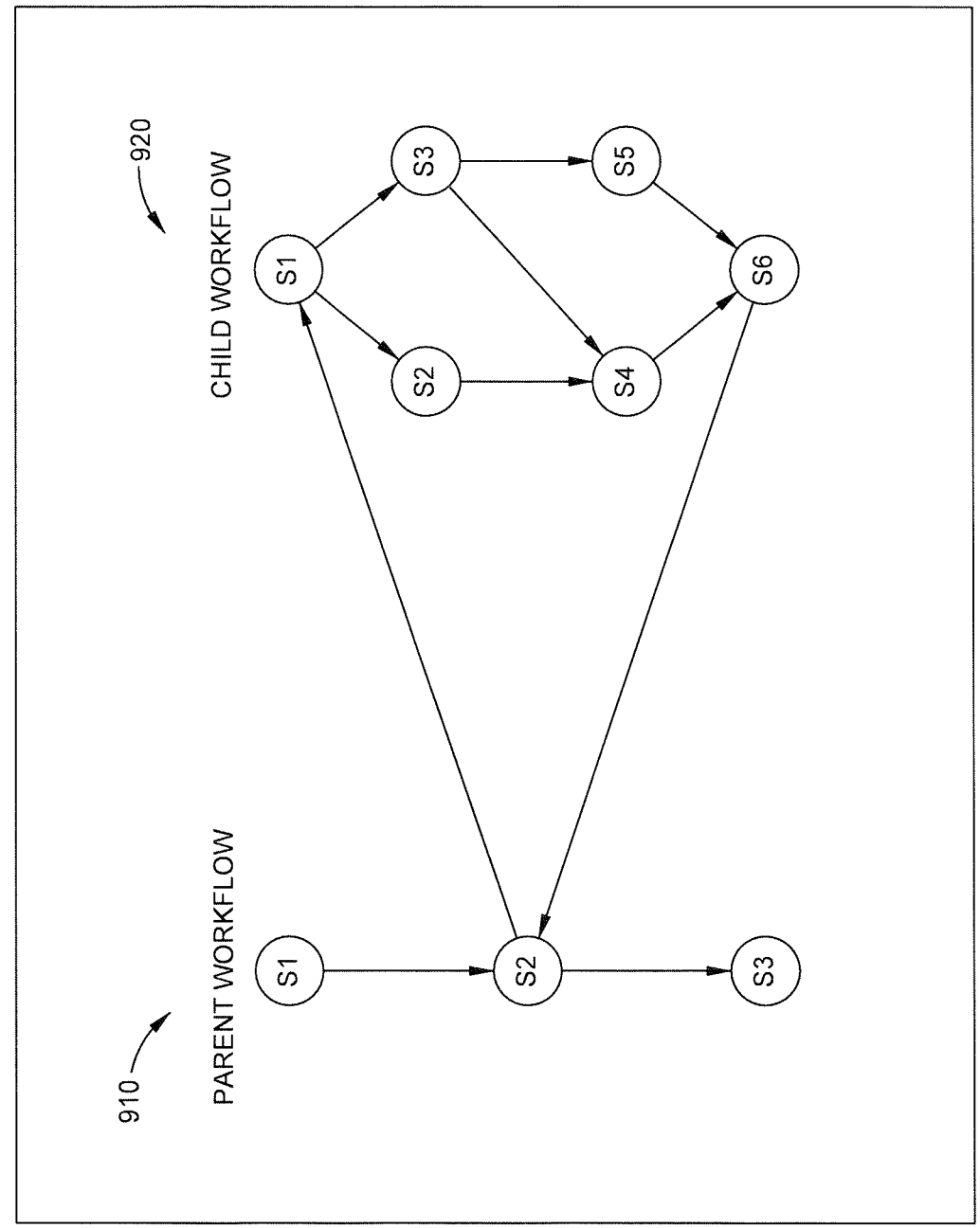
FIG. 9 illustrates a composite choreographic workflow, according to one embodiment described herein.

Additionally, unlike SCXML state charts which are monolithic, SNN networks are modular and can be composed to build very powerful control systems. Multiple SNN networks can be combined by connecting them using internetwork links (synapses) which carry signals across multiple SNN networks. An example of such a composite choreographic workflow is shown in FIG. 9 In the depicted example, the workflow 900 includes a parent workflow 910 and a child workflow 920. Such a composite SNN networks can be very useful in orchestrating choreographic workflows. For example, a parent workflow can dynamically inject a child workflow to one of its step to perform some sub-tasks. In this case, the system can be modeled as two SNN networks, one for the parent workflow and one for the child workflow. The parent task can send the signal to start the child workflow, which upon completion will send a signal back to the parent task to notify it about the completion of the child workflow.

Figure 10:
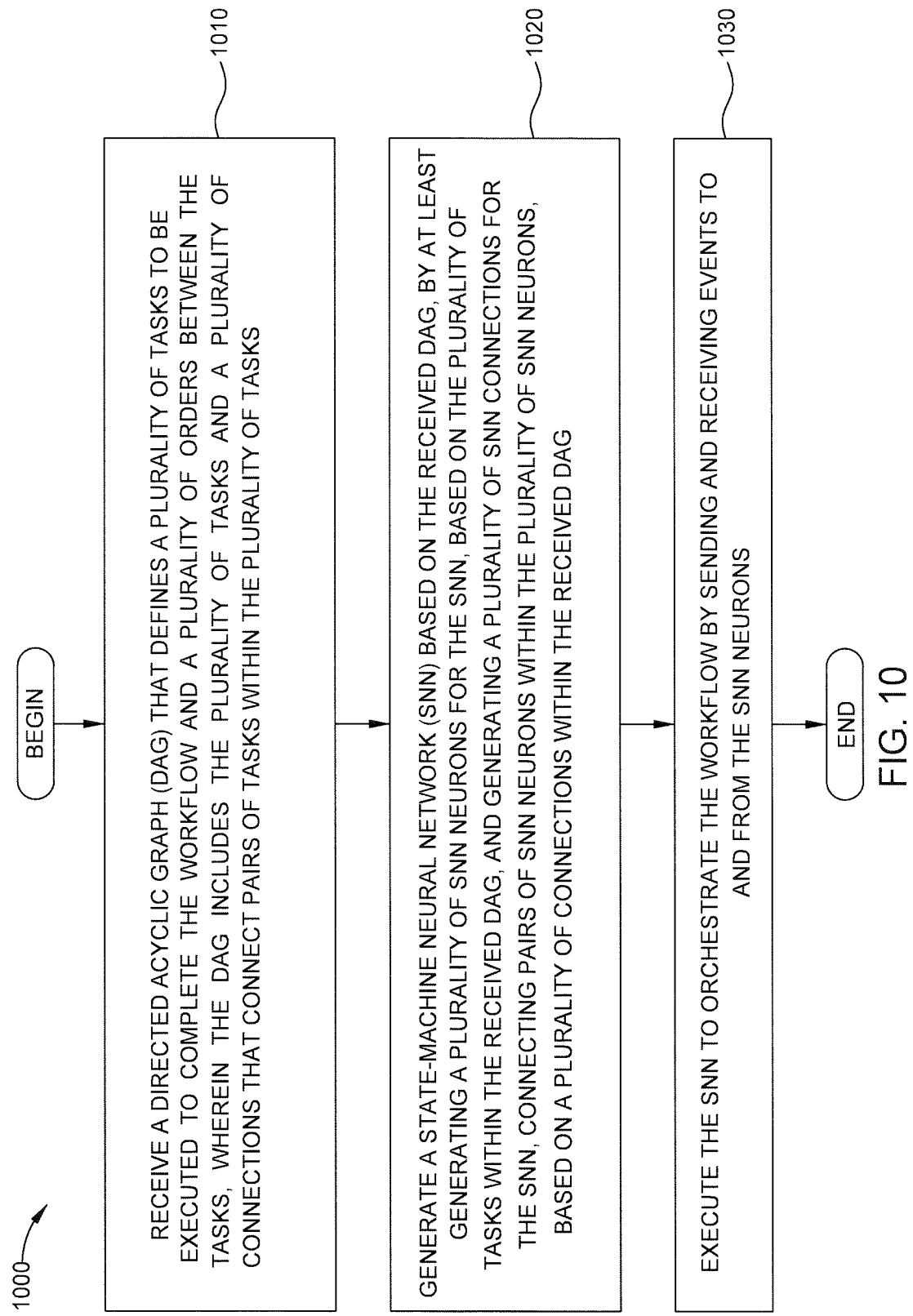
FIG. 10 is a flow diagram illustrating a method for configuring a plurality of networking devices within a computer networking environment using a SNN, according to one embodiment described herein.

FIG. 10 is a flow diagram illustrating a method for configuring a plurality of networking devices within a computer networking environment using a SNN, according to one embodiment described herein. As shown, the method 1000 begins at block 1010, where the network automation and orchestration component 130 receives a DAG structure that defines a plurality of tasks to be executed to complete the workflow and a plurality of orders between the tasks. In the depicted embodiment, the DAG includes a plurality of tasks and a plurality of connections that connect pairs of tasks within the plurality of tasks.

The network automation and orchestration component 130 then generates a SNN structure based on the received DAG structure (block 1020). In the depicted embodiment, the network automation and orchestration component 130 generates a plurality of SNN neurons for the SNN, based on the plurality of tasks within the received DAG. Each SNN neuron can contain a respective FSM, e.g., the FSM shown in FIG. 6 and discussed above. The network automation and orchestration component 130 further generates a plurality of SNN connections for the SNN, connecting pairs of SNN neurons within the plurality of SNN neurons, based on a plurality of connections within the received DAG. The network automation and orchestration component 130 initiates execution of the SNN to orchestrate the workflow by sending and receiving events to and from the SNN neurons (block 1030), and the method 1000 ends.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of orchestrating a workflow, comprising:
   receiving a Directed Acyclic Graph (DAG) that defines a plurality of computer network configuration tasks to be executed to configure a computer networking environment and a plurality of orders between the plurality of tasks, wherein the DAG includes the plurality of tasks and a plurality of connections that connect pairs of tasks within the plurality of tasks;

generating a State-Machine Neural Network (SNN) based on the received DAG, comprising:

generating a plurality of SNN neurons for the SNN, based on the plurality of computer network configuration tasks within the received DAG, each of the plurality of SNN neurons relating to at least one configuration task for the computer networking environment and comprising a Finite State Machine (FSM) storing a state for the respective SNN neuron and used to determine state changes for the respective neuron according to one or more inputs, comprising:

determining a state transition for the respective neuron, using a state transition function, based on the one or more inputs to the respective neuron and the stored state for the respective neuron; and generating one or more outputs from the respective neuron using an activation function and based on the determined state transition; and generating a plurality of SNN connections for the SNN, connecting pairs of SNN neurons within the plurality of SNN neurons, based on the plurality of connections within the received DAG, wherein connecting pairs of SNN neurons comprises connecting pairs of FSMs each determining a state change based on both one or more inputs and a stored state; and executing the SNN to configure a plurality of networking devices within the computer networking environment by sending and receiving events to and from the SNN neurons.

2. The method of claim 1, wherein generating the plurality of SNN connections further comprises:

generating a first plurality of SNN connections representing first paths within the SNN based on the connections of the received DAG, wherein the first paths are taken during the execution of the SNN responsive to a task corresponding to one of the SNN neurons within a respective pair of SNN neurons completing without error.

3. The method of claim 2, wherein generating the plurality of SNN connections further comprises:

generating a second plurality of SNN connections representing second paths within the SNN, wherein the second paths are taken during the execution of the SNN responsive to a task corresponding to one of the SNN neurons within the respective pair of SNN neurons experiencing an error.

4. The method of claim 3, wherein generating the plurality of SNN connections further comprises:

generating a third plurality of SNN connections representing rollback paths within the SNN, wherein the rollback paths are taken during the execution of the SNN in order to rollback tasks that previously completed without error.

5. The method of claim 1, wherein each of the plurality of SNN neurons comprises a respective set of inputs, a set of outputs, the FSM having a plurality of states and receiving events from the inputs, a plurality of state transition actions with conditional logic for sending events to the output selectively.

6. The method of claim 5, wherein the plurality of states include at least one of an initialization state, a running state, an aborted state, a failed state, a completed state, a rollback pending state, a rolling back state, a rollback completed stated and a rollback failed stated.

7. The method of claim 1, wherein generating the plurality of SNN neurons for the SNN further comprises:

generating one or more beginning SNN neurons and one or more ending SNN neurons.

8. The method of claim 1, further comprising:

during execution of the SNN, determining that at least one task experiences an error; and in response, initiating a rollback operation for one or more SNN neurons of the plurality of SNN neurons, wherein the one or more SNN neurons had previously been executed without experiencing an error to perform one or more tasks during the execution of the SNN, and wherein the rollback operation rolls back the one or more tasks.

9. The method of claim 1, further comprising:

during execution of the SNN, generating and updating a graphical user interface (GUI) depicting an execution state of the plurality of SNN neurons.

10. The method of claim 9, wherein the GUI provides an indication of a respective execution state of each of the plurality of SNN neurons by color coding each of the plurality of SNN neurons using a selected one of a plurality of colors based on a current execution state of the respective SNN neuron, wherein each of the plurality of colors corresponds to a distinct execution state of a plurality of execution states.

11. A system, comprising:

one or more computer processors; and a memory containing computer program code that, when executed by operation of the one or more computer processors, performs an operation comprising:

receiving a Directed Acyclic Graph (DAG) that defines a plurality of computer network configuration tasks to be executed to configure a computer networking environment and a plurality of orders between the plurality of tasks, wherein the DAG includes the plurality of tasks and a plurality of connections that connect pairs of tasks within the plurality of tasks;

generating a State-Machine Neural Network (SNN) based on the received DAG, comprising:

generating a plurality of SNN neurons for the SNN, based on the plurality of computer network configuration tasks within the received DAG, each of the plurality of SNN neurons relating to at least one configuration task for the computer networking environment and comprising a Finite State Machine (FSM) storing a state for the respective SNN neuron and used to determine state changes for the respective neuron according to one or more inputs, comprising:

determining a state transition for the respective neuron, using a state transition function, based on the one or more inputs to the respective neuron and the stored state for the respective neuron; and generating one or more outputs from the respective neuron using an activation function and based on the determined state transition; and generating a plurality of SNN connections for the SNN, connecting pairs of SNN neurons within the plurality of SNN neurons, based on the plurality of connections within the received DAG, wherein connecting pairs of SNN neurons comprises connecting pairs of FSMs each determining a state change based on both one or more inputs and a stored state; and executing the SNN to configure a plurality of networking devices within the computer networking environment by sending and receiving events to and from the SNN neurons.

12. The system of claim 11, wherein generating the plurality of SNN connections further comprises:

generating a first plurality of SNN connections representing first paths within the SNN based on the connections of the received DAG, wherein the first paths are taken during the execution of the SNN responsive to a task corresponding to one of the SNN neurons within a respective pair of SNN neurons completing without error.

13. The system of claim 12, wherein generating the plurality of SNN connections further comprises:

generating a second plurality of SNN connections representing second paths within the SNN, wherein the second paths are taken during the execution of the SNN responsive to a task corresponding to one of the SNN neurons within the respective pair of SNN neurons experiencing an error.

14. The system of claim 13, wherein generating the plurality of SNN connections further comprises:

generating a third plurality of SNN connections representing rollback paths within the SNN, wherein the rollback paths are taken during the execution of the SNN in order to rollback tasks that previously completed without error.

15. The system of claim 11, wherein each of the plurality of SNN neurons comprises a respective set of inputs, a set of outputs, the FSM having a plurality of states and receiving events from the inputs, a plurality of state transition actions with conditional logic for sending events to the output selectively.

16. The system of claim 15, wherein the plurality of states include at least one of an initialization state, a running state, an aborted state, a failed state, a completed state, a rollback pending state, a rolling back state, a rollback completed stated and a rollback failed stated.

17. The system of claim 11, wherein generating the plurality of SNN neurons for the SNN further comprises:

generating one or more beginning SNN neurons and one or more ending SNN neurons.

18. The system of claim 11, the operation further comprising:

during execution of the SNN, determining that at least one task experiences an error y; and in response, initiating a rollback operation for one or more SNN neurons of the plurality of SNN neurons, wherein the one or more SNN neurons had previously been executed without experiencing an error to perform one or more tasks during the execution of the SNN, and wherein the rollback operation rolls back the one or tasks.

19. The system of claim 11, the operation further comprising:

during execution of the SNN, generating and updating a graphical user interface (GUI) depicting an execution state of the plurality of SNN neurons, wherein the GUI provides an indication of a respective execution state of each of the plurality of SNN neurons by color coding each of the plurality of SNN neurons using a selected one of a plurality of colors based on a current execution state of the respective SNN neuron, wherein each of the plurality of colors corresponds to a distinct execution state of a plurality of execution states.

20. A non-transitory computer-readable medium containing computer program code that, when executed by operation of one or more computer processors, performs an operation comprising:

receiving a Directed Acyclic Graph (DAG) that defines a plurality of computer network configuration tasks to be executed to configure a computer networking environment and a plurality of orders between the plurality of tasks, wherein the DAG includes the plurality of tasks and a plurality of connections that connect pairs of tasks within the plurality of tasks;

generating a State-Machine Neural Network (SNN) based on the received DAG, comprising:

generating a plurality of SNN neurons for the SNN, based on the plurality of computer network configuration tasks within the received DAG, each of the plurality of SNN neurons relating to at least one configuration task for the computer networking environment and comprising a Finite State Machine (FSM) storing a state for the respective SNN neuron and used to determine state changes for the respective neuron according to one or more inputs, comprising:

determining a state transition for the respective neuron, using a state transition function, based on the one or more inputs to the respective neuron and the stored state for the respective neuron; and generating one or more outputs from the respective neuron using an activation function and based on the determined state transition; and generating a plurality of SNN connections for the SNN, connecting pairs of SNN neurons within the plurality of SNN neurons, based on the plurality of connections within the received DAG, wherein connecting pairs of SNN neurons comprises connecting pairs of FSMs each determining a state change based on both one or more inputs and a stored state; and executing the SNN to configure a plurality of networking devices within the computer networking environment workflow by sending and receiving events to and from the SNN neurons.

* * * * *

UNITED STATES PATENT AND TRADEMARK OFFICE
CERTIFICATE OF CORRECTION

PATENT NO. : 11,961,006 B1  
APPLICATION NO. : 16/368516  
DATED : April 16, 2024  
INVENTOR(S) : Aniruddh S. Dikhit et al.

Page 1 of 1

It is certified that error appears in the above-identified patent and that said Letters Patent is hereby corrected as shown below:

On the Title Page

In item (56), in Column 2, under "Other Publications", Line 2, delete "Inproceedings." and insert -- In Proceedings. --.

On the page 2, in Column 1, under "Other Publications", Line 12, delete "In2011" and insert -- In 2011 --.

On the page 2, in Column 1, under "Other Publications", Line 22, delete "Fronttiers" and insert -- Frontiers --.

In the Specification

In Column 12, Line 49, delete "SSN" and insert -- SNN --.

In the Claims

In Column 19, Line 50, in Claim 18, delete "error y;" and insert -- error; --.

In Column 19, Line 56, in Claim 18, delete "or" and insert -- or more --.

In Column 20, Line 54, in Claim 20, delete "workflow by" and insert -- by --.

Signed and Sealed this  
Twenty-second Day of October, 2024

Katherine Kelly Vidal  
*Director of the United States Patent and Trademark Office*